US012591246B2

(12) United States Patent
Albrecht et al.

(10) Patent No.: US 12,591,246 B2
(45) Date of Patent: Mar. 31, 2026

(54) METHOD AND DEVICE FOR REMOTELY CONTROLLING A VEHICLE

(71) Applicant: Robert Bosch GmbH, Stuttgart (DE)

(72) Inventors: Benno Albrecht, Holsmaden (DE); Selina Meier, Ludwigsburg (DE); Thomas Scheuerle, Friolzheim (DE); Anurag Mehta, Bietigheim-Bissingen (DE); Meike Fehse, Nersingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 8 days.

(21) Appl. No.: 18/529,423

(22) Filed: Dec. 5, 2023

(65) Prior Publication Data

US 2024/0192694 A1      Jun. 13, 2024

(30) Foreign Application Priority Data

Dec. 9, 2022     (DE) ..................... 10 2022 213 405.2

(51) Int. Cl.
G05D 1/222          (2024.01)
B62D 15/02          (2006.01)
(Continued)

(52) U.S. Cl.
CPC ......... G05D 1/222 (2024.01); B62D 15/0285 (2013.01); G05D 1/622 (2024.01); G05D 2109/10 (2024.01)

(58) Field of Classification Search
CPC .... G05D 1/222; G05D 1/622; G05D 2109/10; G05D 1/0011; G05D 1/0061;
(Continued)

(56) References Cited

U.S. PATENT DOCUMENTS

| 2016/0116441 A1* | 4/2016 | Fukuman | ................ G01S 7/527 |
| | | | 73/597 |
| 2019/0204821 A1* | 7/2019 | Yoon | .................... G05D 1/0223 |

(Continued)

FOREIGN PATENT DOCUMENTS

| DE | 102014215096 A1 * | 2/2016 | ......... B62D 15/0285 |
| EP | 2617627 B1 | 10/2016 | |
| EP | 3929046 A1 * | 12/2021 | ......... B62D 15/0285 |

OTHER PUBLICATIONS

DE102014215096 original and translation (Year: 2016).*

*Primary Examiner* — Kito R Robinson
*Assistant Examiner* — Zachary E. F. Glade
(74) *Attorney, Agent, or Firm* — NORTON ROSE FULBRIGHT US LLP

(57) ABSTRACT

A method and device for remotely controlling a motor vehicle. A remote control device is provided. A transceiver device is located in the vehicle and is configured to exchange signals with the remote control device. A signal from the remote control device to the transceiver device activates a first operating mode in the vehicle, in which operating mode the vehicle moves autonomously, while maintaining specifiable surrounding conditions. The first operating mode is left if the specifiable surrounding conditions can no longer be maintained. After leaving the first operating mode, a second operating mode can be activated by a further signal to the transceiver device. In the second operating mode, the vehicle also moves autonomously but while maintaining further surrounding conditions which are at least partially changed in comparison to the surrounding conditions that can be specified in the first operating mode.

17 Claims, 3 Drawing Sheets

(51) Int. Cl.
    *G05D 1/622*        (2024.01)
    *G05D 109/10*     (2024.01)

(58) Field of Classification Search
    CPC ...... G05D 1/0212; G05D 1/646; G05D 1/227;
                    G05D 2107/13; B62D 15/0285; G05B
                      19/0423; G05B 2219/23051; B60W
                60/001; B60W 60/0011; B60W 2556/45;
               B60W 2556/50; B60W 2756/10; B60W
               30/10; B60W 40/072; B60W 40/105;
          B60W 40/109; B60W 2050/0005; B60W
            2050/005; B60W 2050/0064; B60W
              2520/10; B60W 2520/125; B60W
                                 2552/30
    See application file for complete search history.

(56)              References Cited

U.S. PATENT DOCUMENTS

2021/0339782 A1* 11/2021 Tang .................... G05D 1/2446
2023/0127044 A1*  4/2023 Takagi ................. B60W 30/09
                                           701/301

* cited by examiner

US 12,591,246 B2

**METHOD AND DEVICE FOR REMOTELY
CONTROLLING A VEHICLE**

*FIELD*

The present invention relates to a method and device for remotely controlling a vehicle.

*BACKGROUND INFORMATION*

Various systems for remotely controlling motor vehicles (e.g., passenger cars) are described in the related art. They are in particular systems with which a user who is located outside a motor vehicle can cause and carry out driving maneuvers of the vehicle by means of a remote control device. In particular for maneuvering in situations which only ensure a limited overview from the vehicle, the driver of the vehicle can proceed to a position outside the vehicle, from which position, for example, bottlenecks between their vehicle and its surroundings can be estimated more easily and corresponding steering or control maneuvers for the vehicle can be performed more safely. From outside the vehicle, the driver of a vehicle can also maneuver their vehicle out of the parking space if access to their vehicle is made difficult or impossible by closely parked adjacent vehicles.

One of the most important applications for such a function consists in driving into or out of garages, the small width of which makes comfortably getting into and out of the vehicle difficult. Such a system is, for example, described in European Patent No. EP 2617627B1.

*SUMMARY*

The present invention is based on a method or device, described at the outset, for remotely controlling a vehicle, in particular a motor vehicle. In addition to the vehicle, a remote control device is provided and furthermore includes:

a transceiver device which is located in the vehicle and configured to exchange signals with the remote control device;

sensors, mounted in or on the vehicle, for sensing the surroundings of the vehicle;

a signal from the remote control device to the transceiver device activates a first operating mode in the vehicle, in which operating mode the vehicle moves autonomously, i.e., without the help of a driver located in the vehicle, while maintaining specifiable surrounding conditions;

the first operating mode is left if the specifiable surrounding conditions can no longer be maintained.

According to an example embodiment of the present invention, after leaving the first operating mode, a second operating mode can be activated by a further signal to the transceiver device. In the second operating mode, the vehicle also moves autonomously but while maintaining further surrounding conditions which are at least partially changed in comparison to the surrounding conditions that can be specified in the first operating mode.

For understanding the present invention, at this point, an application on which the present invention is based is first explained in more detail:

The driver assistance function on which the present invention is based is a parking and maneuvering function, in which the vehicle can autonomously drive around obstacles at a low speed of, for example, at most approximately 2 km/h or can drive along walls. The function is generally controlled in remote operation, i.e., the driver does not sit in the vehicle but rather is in the immediate vicinity (for example, max. distance: 6 m) and lets the vehicle drive forward or backward by pressing a corresponding button of a remote control, e.g., a smartphone app. The control of the transverse and longitudinal guidance generally takes place by a parking control unit in such a way that obstacles in the vehicle surroundings are driven around as much as possible. If an obstacle cannot be driven around due to its unfavorable position, e.g., directly centrally in front of the vehicle, the vehicle stops directly in front of the obstacle.

An important application for this function consists in driving into or out of narrow garages, the small width of which makes comfortably getting into and out of the vehicle in the garage difficult. Often, the gates of such garages ("bottlenecks") are so narrow that the vehicle cannot pass through them with the "normal" lateral safety distances (approximately 30 to 35 cm). In order to nevertheless be able to pass through a narrower garage gate, the "Narrow Distance" subfunction with the following, temporally successive steps (the described remote function was previously activated, and the vehicle drives toward a bottleneck, e.g., a garage gate) can be implemented according to the present invention in this application:

1. Shortly before reaching the bottleneck, i.e., when reaching the longitudinal or frontal safety distance, or even somewhat earlier if necessary, the vehicle stops.
2. The driver receives (on the remote control) a message such as:
   "Bottleneck ahead. Vehicle can only continue with reduced lateral safety distances."
3. The driver confirms this message. Thereupon, the lateral safety distances are set to a second, smaller value (e.g., approximately 15 to 20 cm).
4. By touching or pushing the safety or direction button, the driver lets the vehicle continue or drive through the bottleneck.

It should be explicitly pointed out here that the described function of "Narrow Distance" subfunction is only one embodiment of the idea according to the present invention. A further embodiment of the present invention, which in particular allows continuing in the case of obstacles that are not actually present but measured, will additionally be described.

Overall, the present invention has an advantage that, despite narrow spatial conditions and/or incorrect measurements of obstacles, a comfortable remote control is made possible.

As described with reference to the application, it is advantageously provided that at least one of the surrounding conditions is specified in such a way that a predetermined target distance of the vehicle from an obstacle is maintained. In this case, the signals of at least one of the sensors are used to sense the surroundings of the vehicle.

As also already shown with reference to the example, the at least partially changed surrounding conditions of the second operating mode are designed in such a way that at least the predetermined target distance of the vehicle from an obstacle is reduced.

Another embodiment of the present invention consists in that the at least partially changed surrounding conditions of the second operating mode are designed in such a way that, at least for a particular time and/or for a particular driving route in the second operating mode, obstacles that have resulted in leaving the first operating mode no longer result in leaving the second operating mode.

The background of this embodiment of the present invention is the following:

Even if the vehicle can theoretically drive through a garage gate due to the lateral safety distance or also due to the already reduced lateral safety distance, it occasionally occurs that the vehicle suddenly stops while driving through the garage gate and that a continuation of the trip is not possible.

In most of these cases, the stopping of the vehicle is caused by a virtual "ghost object" within the lateral safety zone, i.e., by an incorrect detection by the sensor system. The cause of such incorrect detections is usually so-called incorrect triangulations in the measuring ultrasonic system. If such a ghost object in the lateral safety zone cannot be proven to be unlikely by subsequent, later remeasurements, i.e., it remains as a virtual object in the immediate vicinity of the vehicle, the vehicle cannot continue its trip and the remote operation must be aborted.

For this case, the present invention now provides that the at least partially changed surrounding conditions of the second operating mode are designed in such a way that, at least for a particular time and/or for a particular driving route in the second operating mode, obstacles (virtual objects) that have resulted in leaving the first operating mode no longer result in leaving the operating mode.

In a particularly advantageous embodiment of the present invention, it is provided that, after leaving the first operating mode (remote operation), a signal is transmitted from the transceiver device to the remote control device, and the activation of the second operating mode (continuation of remote operation) takes place by a further (release) signal from the remote control device to the transceiver device. That is, the user of the remote operation must release the continuation according to the present invention of the remote operation.

Furthermore, according to an example embodiment of the present invention, it can be provided that the second operating mode can be activated only for particular obstacles. This has the following background:

The user of the remote operation, usually the driver located outside the vehicle, assuming the responsibility presupposes the visibility of the region of the vehicle surroundings in which the possible (incorrect) detection occurred. This relates in particular to the regions on the left and right sides of the vehicle. This embodiment according to the present invention therefore applies only to these (lateral vehicle) regions and not, for example, to (incorrect) detections that may occur on the front or rear sides of the vehicle facing away from the driver located outside the vehicle. That is, the obstacles that result in the activatability of the second operating mode must be sensed laterally in the movement direction of the vehicle, and/or the obstacles having a sensed extension in the movement direction of the vehicle at the front or rear must not result in the activatability of the second operating mode.

Of course, the present invention can also be applied repeatedly, that is, that the method according to the present invention is carried out even after leaving the second operating mode, in such a way that, after leaving the second operating mode, a third operating mode can be activated by a further signal to the transceiver device, in which the vehicle autonomously moves while maintaining further surrounding conditions which are at least partially changed in comparison to the surrounding conditions specifiable in the second operating mode.

Further advantageous embodiments of the present invention are disclosed herein.

BRIEF DESCRIPTION OF THE DRAWINGS

Exemplary embodiments of the present invention are explained in more detail with reference to the figures and the following description.

DETAILED DESCRIPTION OF EXAMPLE EMBODIMENTS

The figures show schematic representations of exemplary embodiments of the present invention.

Figure 1:
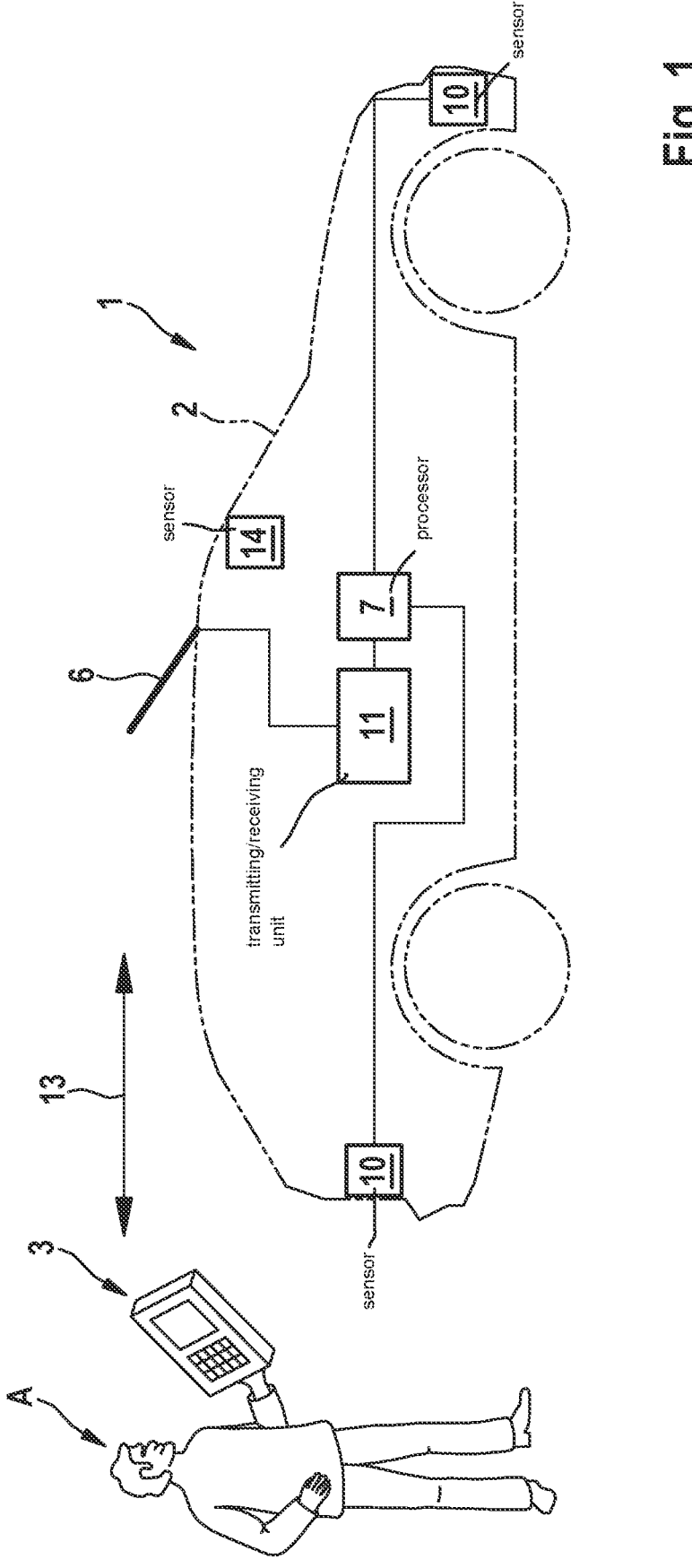
FIG. 1 shows a schematic representation of the components of the present invention on the basis of an exemplary embodiment of the present invention.

FIG. 1 shows an overview in which a user A holds a remote control 3 as a remote control device in their hand. The remote control 3 is configured to communicate with a transmitting/receiving unit 11 of the vehicle 2 via the antenna 6. This communication takes place via signals 13. For the evaluation of the control commands, the vehicle 2 has a processor 7 which also receives and processes signals from the environmental sensors 10 and 14 and controls the drive and/or the brakes and/or the steering of the vehicle 2. An object map, updated continuously by new measurements, with the position of the objects relative to the vehicle is then stored in the processor 7 (including storage media).

Ultrasound-based and/or video-based sensors 10 and/or 14 can be provided as environmental sensors. The cameras used in this exemplary embodiment are usually mounted at the front, rear and on the side mirrors of the vehicle; FIG. 1 thus shows only one front camera for the sake of simplicity.

Figure 2:
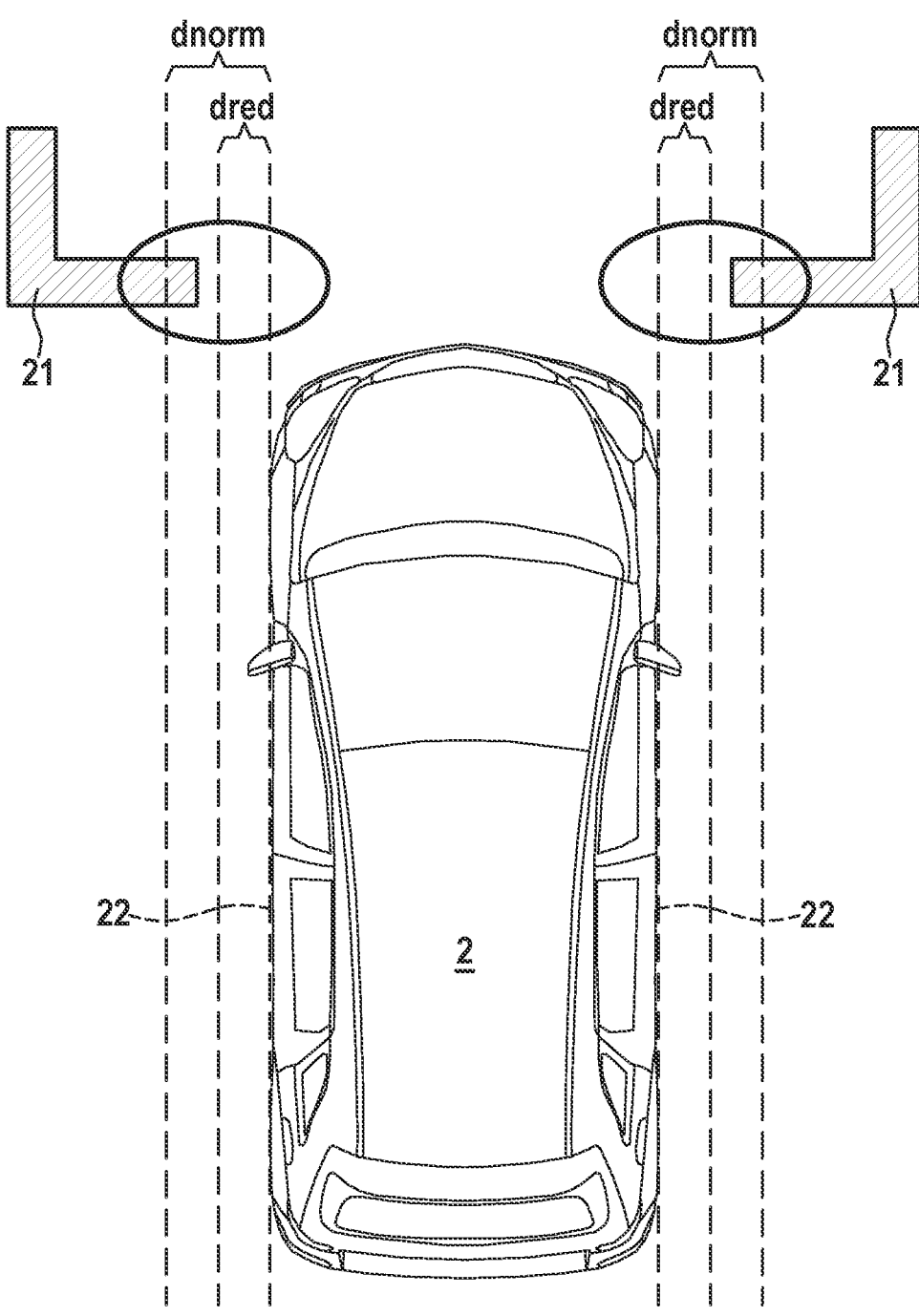
FIG. 2 shows the spatial conditions of an exemplary embodiment of the present invention.

FIG. 2 now shows the situation as has already been described at the outset.

The vehicle 2 stands in front of a garage, for which only the entry boundaries 21 are shown in FIG. 2. The vehicle longitudinal contour is denoted by the lines 22. The normal safety distance from the vehicle to obstacles such as the garage entrance 21 is denoted by reference sign dnorm. However, the vehicle contour also allows a reduced safety distance dred. That is, the vehicle with the shown contour can also be moved into the garage without damage with the reduced safety distance.

In FIG. 2, the driver located outside the vehicle stands behind the vehicle and initiates the remote operation for driving into the garage. If the vehicle now comes to a stop before reaching the target position in the garage, this could have two reasons (separately or in combination):

1. The distance between the boundaries 21 of the garage entrance is too small for the set normal safety distance dnorm.
2. A virtual obstacle described above is detected (incorrect detection).

If the remote operation is continued after the explicit confirmation by the driver, the following alternative processing steps are possible in order to enable a reliable continuation of the trip of the vehicle:

1. The object that caused the stop of the vehicle or the incorrect detection that has occurred within the lateral reduced safety zone is provided with the "virtual" status in the object map of the parking control unit 7 and is no longer taken into account in the further time course of the remote operation. As a result, this incorrectly detected object cannot result in a further interruption of the maneuver/remote operation. However, any further incorrect detections that occur will then again result in aborting and further remote operation to be released. In the further remote operation to be released, these "new," incorrectly detected objects will then likewise not be taken into account.

2. The lateral safety distances dnorm are set to a smaller value dred. This value can be set to below the distance of the (incorrect) detection from the vehicle contour (e.g., 12 cm). As a result, both the current, (incorrectly) detected object and all further objects above the new, further reduced lateral safety distance dred ("intelligent narrow distance") are no longer taken into account and can consequently also no longer result in any further, undesired stopping of the vehicle. In the case of any further (incorrect) detections at even smaller distances from the vehicle contour, the lateral safety distances can be correspondingly further reduced after renewed confirmation by the driver, up to a previously defined absolute minimum safety distance (e.g., 5 cm).

The two methods 1. and 2. described above apply only to the course of a single function activation. That is, as soon as the remote operation is terminated as a result of reaching the target position and is restarted, all existing object markings, reduced safety distances, etc., are reset to their initial values.

According to an example embodiment of the present invention, in order to reduce the risk of an undesired collision with an obstacle actually located within the reduced lateral safety distance, the steering can additionally be limited according to the invention in such a way that the location of the incorrect detection or of the obstacle can no longer be driven over with the vehicle contour in the further course of the maneuver.

Figure 3:
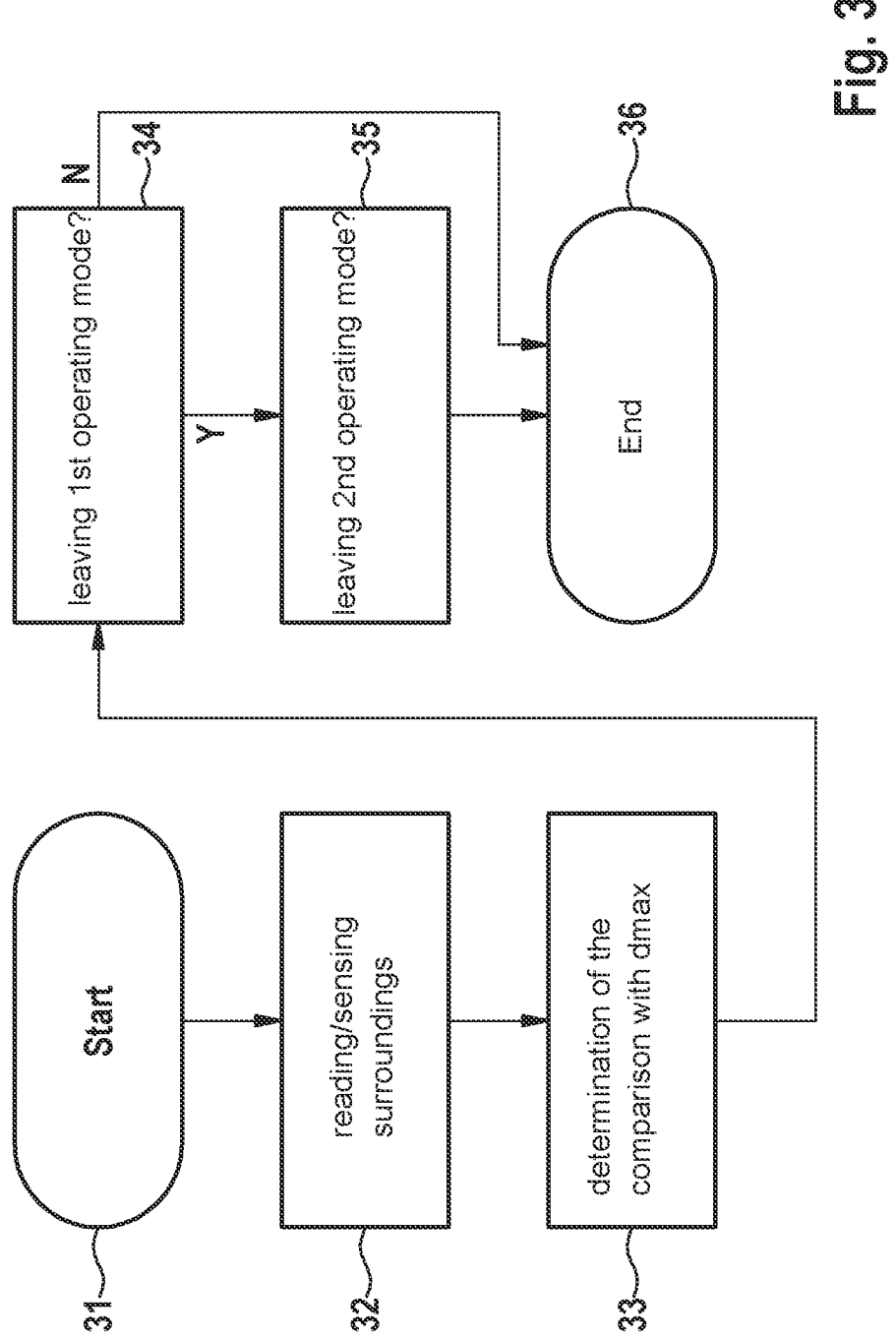
FIG. 3 shows a schematic sequence of the exemplary embodiment according to the present invention.

In FIG. 3, after starting step 31, the data of the environmental sensors 10 and 14 are read and evaluated in method step 32, in particular with respect to the position of possible obstacles 21 relative to the vehicle. In step 33, the distance d of an object, recognized as an obstacle, relative to the vehicle 2 is then ascertained on the basis of the results obtained in step 32. This value d is then compared to the normal safety distance dnorm already described. Depending on the comparison result, it is then decided in step 34 whether the remote operation (first operating mode) is left (current distance smaller than dnorm) or not (current distance greater than dnorm).

If the operation remains in remote operation (current distance greater than dnorm), skipping from step 34 directly to final step 36 takes place, and the sequence is started again with starting step 31.

If the remote operation must be interrupted (current distance smaller than dnorm), the release for the continuation of the remote operation is initiated in step 35 with the modifications already described (reduction in the target distance and/or ignoring of the incorrectly measured object).

After final step 36, the sequence is started again with starting step 31.

The invention claimed is:

1. A method for remotely controlling a vehicle using a remote control device, the vehicle includes a transceiver device configured to exchange signals with the remote control device, the vehicle has sensors configured to sense surroundings of the vehicle, the method comprising the following steps:

activating, by a signal to the transceiver, a first operating mode in which the vehicle moves autonomously while maintaining specifiable surrounding conditions;

leaving the first operating mode when the specifiable surrounding conditions can no longer be maintained;

determining, in response to leaving the first operating mode, whether the leaving was caused by an incorrect detection in a region lateral to a direction of travel of the vehicle within the specifiable surrounding conditions;

providing, in response to determining that the leaving was caused by an incorrect detection in the region lateral to the direction of travel of the vehicle within the specifiable surrounding conditions, a virtual status to the specifiable surrounding conditions that caused the leaving;

after leaving the first operating mode, activating a second operating mode by a further signal to the transceiver device, wherein in the second operating mode, the vehicle autonomously moves while maintaining further surrounding conditions which are at least partially changed in comparison to the specifiable surrounding conditions; and terminating, in response to the vehicle reaching a target position, the second operating mode, the terminating including resetting the specifiable surrounding conditions and the further surrounding conditions.

2. The method according to claim 1, wherein at least one of the surrounding conditions is specified in such a way that a predetermined target distance of the vehicle from an obstacle is maintained, wherein signals of at least one of the sensors are used to sense the surroundings of the vehicle.

3. The method according to claim 2, wherein the at least partially changed surrounding conditions of the second operating mode are configured in such a way that at least the predetermined target distance of the vehicle from an obstacle is reduced.

4. The method according to claim 2, wherein the second operating mode can be activated only for particular obstacles.

5. The method according to claim 4, wherein obstacles that result in the activatability of the second operating mode are sensed laterally relative to a movement direction of the vehicle.

6. The method according to claim 4, wherein obstacles having a sensed extension in a movement direction of the vehicle at a front or a rear do not result in the activatability of the second operating mode.

7. The method according to claim 1, wherein the at least partially changed surrounding conditions of the second operating mode are configured in such a way that, at least for a particular time in the second operating mode and/or for a particular driving route in the second operating mode, obstacles that have resulted in leaving the first operating mode do not result in leaving the second operating mode.

8. The method according to claim 1, wherein, after leaving the first operating mode, a signal is transmitted from the transceiver device to the remote control device, and the activation of the second operating mode takes place by a further signal from the remote control device to the transceiver device.

9. The method according to claim 1, wherein the method is carried out even after leaving the second operating mode in such a way that, after leaving the second operating mode, a third operating mode can be activated by a further signal to the transceiver device, in which the vehicle autonomously moves while maintaining surrounding conditions which are at least partially changed in comparison to the further surrounding conditions specifiable in the second operating mode.

10. The method of claim 1, wherein the incorrect detection within the specifiable surrounding conditions that caused the leaving the first operating mode is a virtual ghost object.

11. The method of claim 10, wherein the virtual ghost object is caused by incorrect triangulations of one or more signals measured by at least one sensor of the sensors configured to sense surroundings of the vehicle.

12. The method of claim 1, further comprising limiting control of the vehicle in the second operating mode such that the vehicle autonomously moves in a manner that avoids the specifiable surrounding conditions with the virtual status that caused the leaving.

13. The method of claim 12, wherein the limiting control of the vehicle includes limiting steering of the vehicle.

14. A system for remotely controlling a vehicle, comprising:

a vehicle; and a remote control device;

wherein the vehicle includes a transceiver device configured to exchange signals with the remote control device, and sensors for sensing surroundings of the vehicle;

wherein the system is configured such that a first operating mode is activated by a signal to the transceiver device, in which the vehicle moves autonomously while maintaining specifiable surrounding conditions, and the first operating mode is left if the specifiable surrounding conditions can no longer be maintained;

wherein the system is further configured to determine, in response to leaving the first operating mode, whether the leaving was caused by an incorrect detection in a region lateral to a direction of travel of the vehicle within the specifiable surrounding conditions;

wherein the system is further configured to provide, in response to determining that the leaving was caused by an incorrect detection in the region lateral to the direction of travel of the vehicle within the specifiable surrounding conditions, a virtual status to the specifiable surrounding conditions that caused the leaving;

wherein the system is further configured such that, after leaving the first operating mode, a second operating mode can be activated by a further signal to the transceiver device, in which the vehicle autonomously moves while maintaining further surrounding conditions which are at least partially changed in comparison to the specifiable surrounding conditions; and wherein the system is further configured to terminate, in response to the vehicle reaching a target position, the second operating mode, the terminating including resetting the specifiable surrounding conditions and the further surrounding conditions.

15. The system of claim 14, wherein the at least partially changed surrounding conditions of the second operating mode are configured in such a way that, at least for a particular time in the second operating mode and/or for a particular driving route in the second operating mode, obstacles that have resulted in leaving the first operating mode do not result in leaving the second operating mode.

16. The system of claim 14, wherein the incorrect detection within the specifiable surrounding conditions that caused the leaving the first operating mode is a virtual ghost object.

17. The system of claim 16, wherein the virtual ghost object is caused by incorrect triangulations of one or more signals measured by at least one sensor of the sensors for sensing the surroundings of the vehicle.

* * * * *